(12) United States Patent
Cheng et al.

(10) Patent No.: US 11,510,081 B2
(45) Date of Patent: Nov. 22, 2022

(54) TECHNIQUES AND APPARATUSES FOR RADIO RESOURCE MANAGEMENT WITH MULTIPLE BANDWIDTH PARTS

(71) Applicant: QUALCOMM Incorporated, San Diego, CA (US)

(72) Inventors: Peng Cheng, Beijing (CN); Masato Kitazoe, Tokyo (JP); Aleksandar Damnjanovic, Del Mar, CA (US); Sumeeth Nagaraja, Los Altos, CA (US); Keiichi Kubota, Tokyo (JP); Wanshi Chen, San Diego, CA (US); Valentin Alexandru Gheorghiu, Yokohama (JP); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/648,948

(22) PCT Filed: Sep. 21, 2018

(86) PCT No.: PCT/CN2018/106901
§ 371 (c)(1),
(2) Date: Mar. 19, 2020

(87) PCT Pub. No.: WO2019/062658
PCT Pub. Date: Apr. 4, 2019

(65) Prior Publication Data
US 2020/0267583 A1    Aug. 20, 2020

(30) Foreign Application Priority Data
Sep. 28, 2017   (WO) ................ PCT/CN2017/103952

(51) Int. Cl.
*H04W 24/10*    (2009.01)
*H04W 48/16*    (2009.01)
*H04W 24/08*    (2009.01)

(52) U.S. Cl.
CPC ........... *H04W 24/10* (2013.01); *H04W 24/08* (2013.01); *H04W 48/16* (2013.01)

(58) Field of Classification Search
CPC ...... H04W 24/10; H04W 24/08; H04W 48/16
See application file for complete search history.

(56) References Cited

U.S. PATENT DOCUMENTS

| | | | |
|---|---|---|---|
| 2005/0111423 A1* | 5/2005 | Anderson | H04W 72/0453 370/341 |
| 2009/0070650 A1* | 3/2009 | Bourlas | H04W 72/04 714/748 |

(Continued)

FOREIGN PATENT DOCUMENTS

| | | |
|---|---|---|
| CN | 101998436 A | 3/2011 |
| CN | 102255685 A | 11/2011 |

OTHER PUBLICATIONS

Huawei, HiSilicon, "Bandwidth part activation and adaptation", R1-1712155, 3GPP TSG RAN WG1 Meeting #90, Aug. 25, 2017 (Year: 2017).*

(Continued)

*Primary Examiner* — Charles C Jiang
*Assistant Examiner* — Thad N Defauw
(74) *Attorney, Agent, or Firm* — Harrity & Harrity LLP/Qualcomm Incorporated

(57) ABSTRACT

Certain aspects of the present disclosure generally relate to wireless communication. In some aspects, a user equipment may determine a measurement regarding a plurality of bandwidth parts of a carrier of the user equipment based at least in part on a measurement object associated with the measurement; determine a cell quality regarding the plural- (Continued)

ity of bandwidth parts based at least in part on the measurement object; and/or transmit a measurement report identifying the measurement and/or the cell quality based at least in part on the measurement object. Numerous other aspects are provided.

46 Claims, 12 Drawing Sheets

(56) References Cited

U.S. PATENT DOCUMENTS

| | | | |
|---|---|---|---|
| 2011/0034198 A1* | 2/2011 | Chen | H04L 25/0202 455/509 |
| 2015/0223149 A1* | 8/2015 | Liu | H04W 24/08 370/252 |
| 2018/0227838 A1* | 8/2018 | Hayashi | H04W 72/042 |
| 2018/0323946 A1* | 11/2018 | Bendlin | H04L 5/0053 |
| 2019/0053235 A1* | 2/2019 | Novlan | H04L 5/001 |
| 2020/0344761 A1* | 10/2020 | Amuru | H04B 7/0452 |
| 2021/0144601 A1* | 5/2021 | Kazmi | H04W 36/0058 |

OTHER PUBLICATIONS

Intel Corp, "Bandwidth parts configuration and operations", R1-1707420, 3GPP TSG RAN WG1 Meeting #89, May 19, 2017 (Year: 2017).*
Huawei: HiSilicon Bandwidth Part Activation and Adaptation 3GPP TSG RAN WG1 Meeting #90, R1-1712155, Aug. 25, 2017.
Intel Corporation: "Bandwidth Parts Configuration and Operations", 3GPP Draft, R1-1707420, 3rd Generation Partnership Project (3GPP), Mobile Competence Centre, 650, Route Des Lucioles, F-06921 Sophia-Antipolis Cedex, France vol. RAN WG1, No. Hangzhou, China, May 15, 2017-May 19, 2017, May 14, 2017 (May 14, 2017), XP051272629, pp. 1-6, Retrieved from the Internet: URL:http://www.3gpp.org/ftp/Meetings_3GPP_SYNC/RAN1/Docs/ [retrieved on May 14, 2017].
International Search Report and Written Opinion—PCT/CN2017/103952—ISA/EPO—dated Jul. 9, 2018.
International Search Report and Written Opinion—PCT/CN2018/106901—ISA/EPO—dated Dec. 12, 2018.
Mediatek Inc: "RRM Measurement for Bandwidth Part Operation", 3GPP Draft, 3GPP TSG-RAN WG2 Meeting #99, R2-1708001, RRM Measurement for BWP Operation, 3rd Generation Partnership Project (3GPP), Mobile Competence Centre; 650, Route Des Lucioles; F-06921, Sophia-Antipolis Cedex; France, vol. RAN WG2, No. Berlin, Germany, Aug. 21, 2017-Aug. 25, 2017, Aug. 20, 2017 (Aug. 20, 2017), XP051317915, 6 pages, Retrieved from the Internet URL:http://www.3gpp.org/ftp/Meetings_3GPP_SYNC/RAN2/Docs/ [retrieved on Aug. 20, 2017], p. 3-p. 4.
Supplementary European Search Report—EP18863625—Search Authority—Munich—dated Jun. 29, 2021.
Supplementary European Search Report—EP18863625—Search Authority—Munich—dated Sep. 30, 2021.
CATT: "L3 Mobility Based on CSI-RS Based Measurements", 3GPP TSG RAN WG1 NR Ad-Hoc#2, R1-1711576, Qingdao, P.R. China Jun. 27-30, 2017, pp. 1-7.
ETRI: "Discussion on Beam Measurement and Reporting", 3GPP TSG RAN WG1 Meeting NR#3, R1-1715760, Nagoya, Japan, Sep. 18-21, 2017, pp. 1-3.
Samsung: "Issues on RRM Measurement Bandwidth in NR", 3GPP TSG-RAN WG2 NR #99 Meeting, R2-1708090, Berlin, Germany, Aug. 21-25, 2017, 6 Pages.
Samsung: "RAN2 Considerations for Bandwidth Part in NR", 3GPP TSG-RAN WG2 NR #99 Meeting, R2-1708088, Berlin, Germany, Aug. 21-25, 2017, 5 Pages.
Samsung: "RRM Measurement for Multiple Numerologies in NR", 3GPP TSG-RAN WG2 NR #99 Meeting, R2-1708092, Berlin, Germany, Aug. 21-25, 2017, 6 Pages.

* cited by examiner

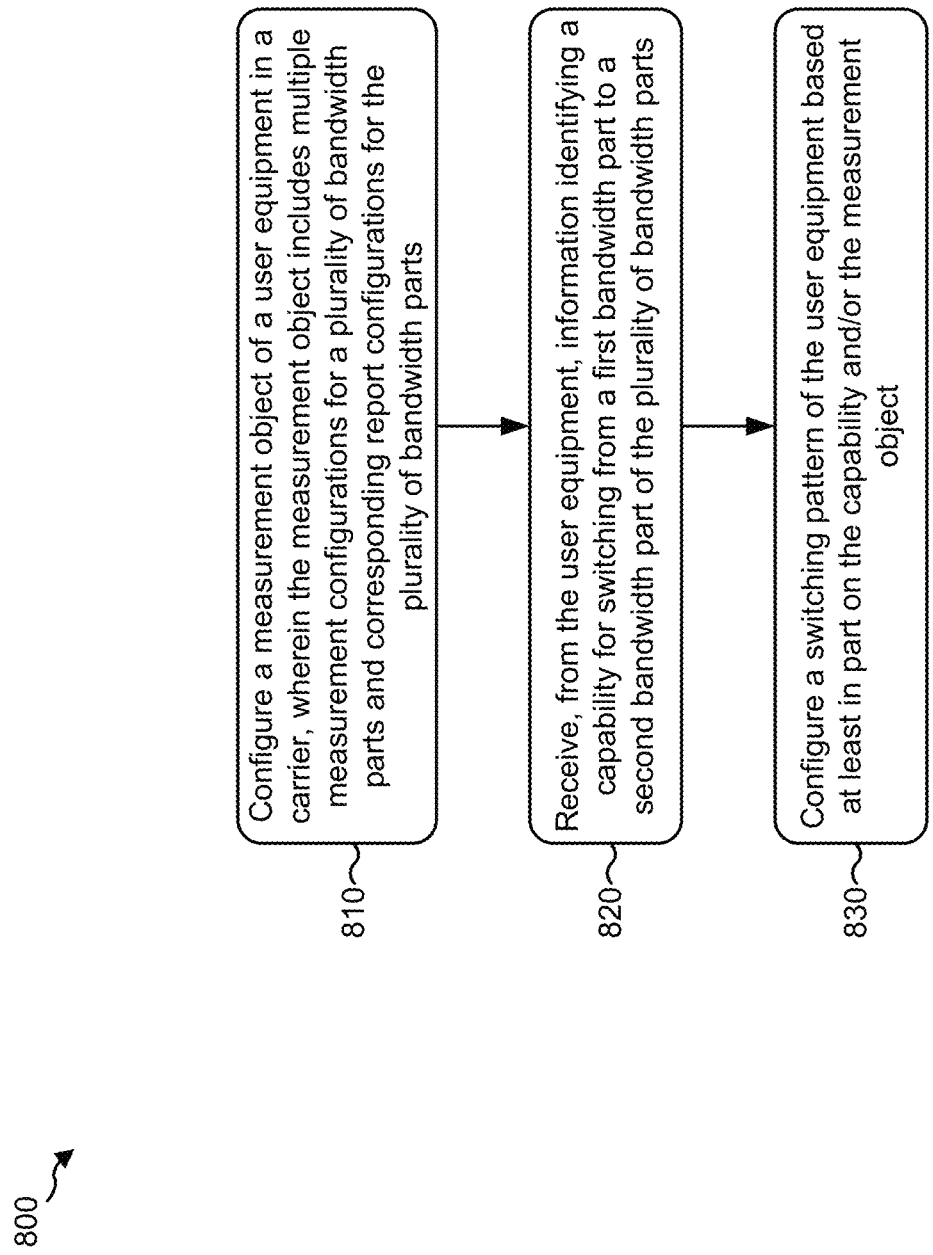

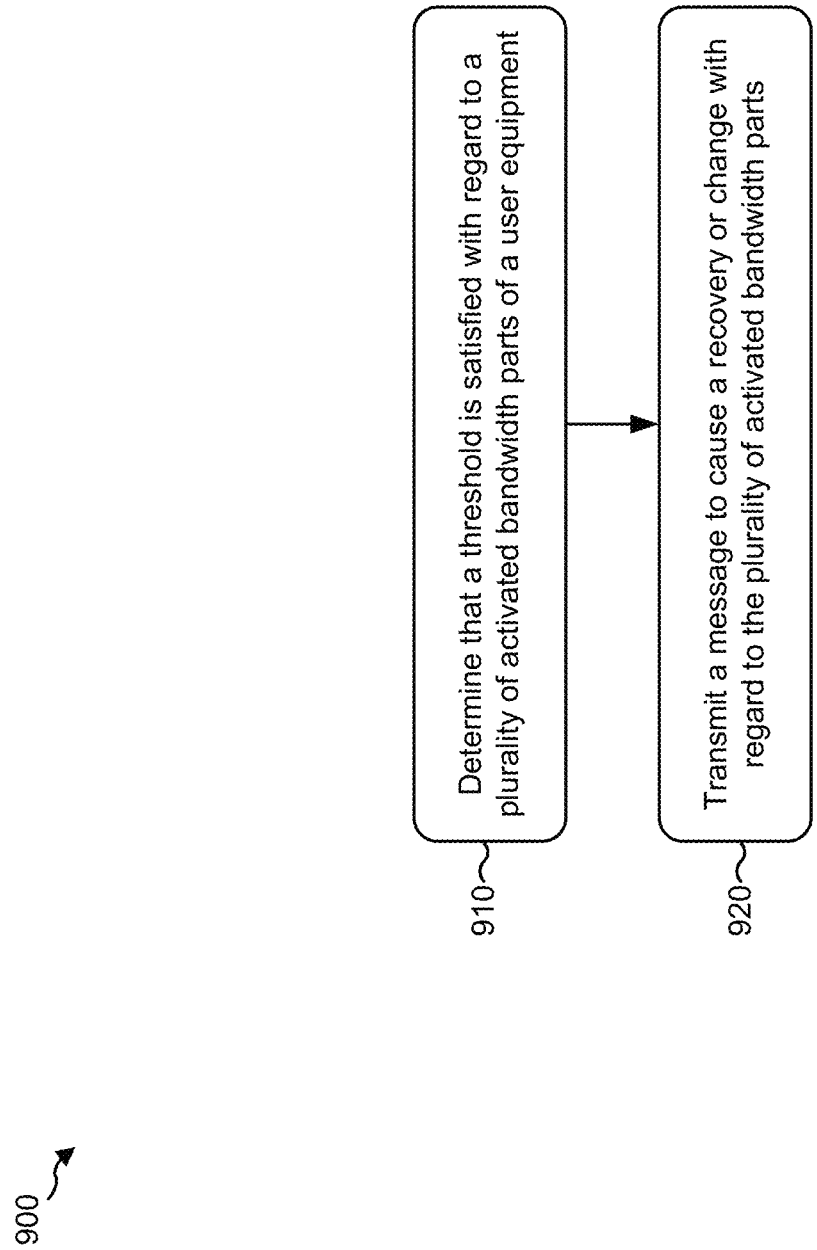

TECHNIQUES AND APPARATUSES FOR RADIO RESOURCE MANAGEMENT WITH MULTIPLE BANDWIDTH PARTS

CROSS-REFERENCE TO RELATED APPLICATIONS

This application is a 371 national stage of PCT Application No. PCT/CN2018/106901 filed on Sep. 21, 2018, entitled "TECHNIQUES AND APPARATUSES FOR RADIO RESOURCE MANAGEMENT WITH MULTIPLE BANDWIDTH PARTS," which claims priority to Patent Cooperation Treaty (PCT) Patent Application No. PCT/CN2017/103952, filed on Sep. 28, 2017, entitled "TECHNIQUES AND APPARATUSES FOR RADIO RESOURCE MANAGEMENT WITH MULTIPLE BANDWIDTH PARTS," all of which are incorporated by reference herein.

FIELD OF THE DISCLOSURE

Aspects of the present disclosure generally relate to wireless communication, and more particularly to techniques and apparatuses for radio resource management with multiple bandwidth parts.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment may include determining a measurement regarding a plurality of bandwidth parts of a carrier of the user equipment based at least in part on a measurement object associated with the measurement; determining a cell quality regarding the plurality of bandwidth parts based at least in part on the measurement object; and/or transmitting a measurement report identifying the measurement and/or the cell quality based at least in part on the measurement object.

In some aspects, a user equipment for wireless communication may include memory and one or more processors operatively coupled to the memory. The memory and the one or more processors may be configured to determine a measurement regarding a plurality of bandwidth parts of a carrier of the user equipment based at least in part on a measurement object associated with the measurement; determine a cell quality regarding the plurality of bandwidth parts based at least in part on the measurement object; and/or transmit a measurement report identifying the measurement and/or the cell quality based at least in part on the measurement object.

In some aspects, a non-transitory computer-readable medium may store one or more instructions for wireless communication. The one or more instructions, when executed by one or more processors of a user equipment, may cause the one or more processors to determine a measurement regarding a plurality of bandwidth parts of a carrier of the user equipment based at least in part on a measurement object associated with the measurement; determine a cell quality regarding the plurality of bandwidth parts based at least in part on the measurement object; and/or transmit a measurement report identifying the measurement and/or the cell quality based at least in part on the measurement object.

In some aspects, an apparatus for wireless communication may include means for determining a measurement regarding a plurality of bandwidth parts of a carrier of the apparatus based at least in part on a measurement object associated with the measurement; determining a cell quality regarding the plurality of bandwidth parts based at least in part on the measurement object; and/or transmitting a measurement report identifying the measurement and/or the cell quality based at least in part on the measurement object.

In some aspects, a method of wireless communication performed by a base station may include configuring a measurement object of a user equipment in a carrier, wherein the measurement object includes multiple measurement configurations for a plurality of bandwidth parts and corresponding reporting configurations for the plurality of bandwidth parts; receiving, from the user equipment, information identifying a capability for switching from a first bandwidth part to a second bandwidth part of the plurality of bandwidth parts; and/or configuring a switching pattern of the user equipment based at least in part on the capability and/or the measurement object.

In some aspects, a base station for wireless communication may include memory and one or more processors operatively coupled to the memory. The memory and the one or more processors may be configured to configure a measurement object of the user equipment in a carrier, wherein the measurement object includes multiple measurement configurations for a plurality of bandwidth parts and corresponding reporting configurations for the plurality of bandwidth parts; receive, from the user equipment, information identifying a capability for switching from a first bandwidth part to a second bandwidth part of the plurality of bandwidth parts; and/or configure a switching pattern of the user equipment based at least in part on the capability and/or the measurement object.

In some aspects, a non-transitory computer-readable medium may store one or more instructions for wireless communication. The one or more instructions, when executed by one or more processors of a base station, may cause the one or more processors to configure a measurement object of the user equipment in a carrier, wherein the measurement object includes multiple measurement configurations for a plurality of bandwidth parts and corresponding reporting configurations for the plurality of bandwidth parts; receive, from the user equipment, information identifying a capability for switching from a first bandwidth part to a second bandwidth part of the plurality of bandwidth parts; and/or configure a switching pattern of the user equipment based at least in part on the capability and/or the measurement object.

In some aspects, an apparatus for wireless communication may include means for configuring a measurement object of a user equipment in a carrier, wherein the measurement object includes multiple measurement configurations for a plurality of bandwidth parts and corresponding reporting configurations for the plurality of bandwidth parts; means for receiving, from the user equipment, information identifying a capability for switching from a first bandwidth part to a second bandwidth part of the plurality of bandwidth parts; and/or means for configuring a switching pattern of the user equipment based at least in part on the capability and/or the measurement object.

In some aspects, a method of wireless communication performed by a user equipment may include determining that a threshold is satisfied with regard to a plurality of activated bandwidth parts of the user equipment; and/or transmitting a message to cause a recovery or change with regard to the plurality of activated bandwidth parts.

In some aspects, a user equipment for wireless communication may include memory and one or more processors operatively coupled to the memory. The memory and the one or more processors may be configured to determine that a threshold is satisfied with regard to a plurality of activated bandwidth parts of the user equipment; and/or transmit a message to cause a recovery or change with regard to the plurality of activated bandwidth parts.

In some aspects, a non-transitory computer-readable medium may store one or more instructions for wireless communication. The one or more instructions, when executed by one or more processors of a user equipment, may cause the one or more processors to determine that a threshold is satisfied with regard to a plurality of activated bandwidth parts of the user equipment; and/or transmit a message to cause a recovery or change with regard to the plurality of activated bandwidth parts.

In some aspects, an apparatus for wireless communication may include means for determining that a threshold is satisfied with regard to a plurality of activated bandwidth parts of the user equipment; and/or means for transmitting a message to cause a recovery or change with regard to the plurality of activated bandwidth parts.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a base station, in accordance with various aspects of the present disclosure.

FIG. 9 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
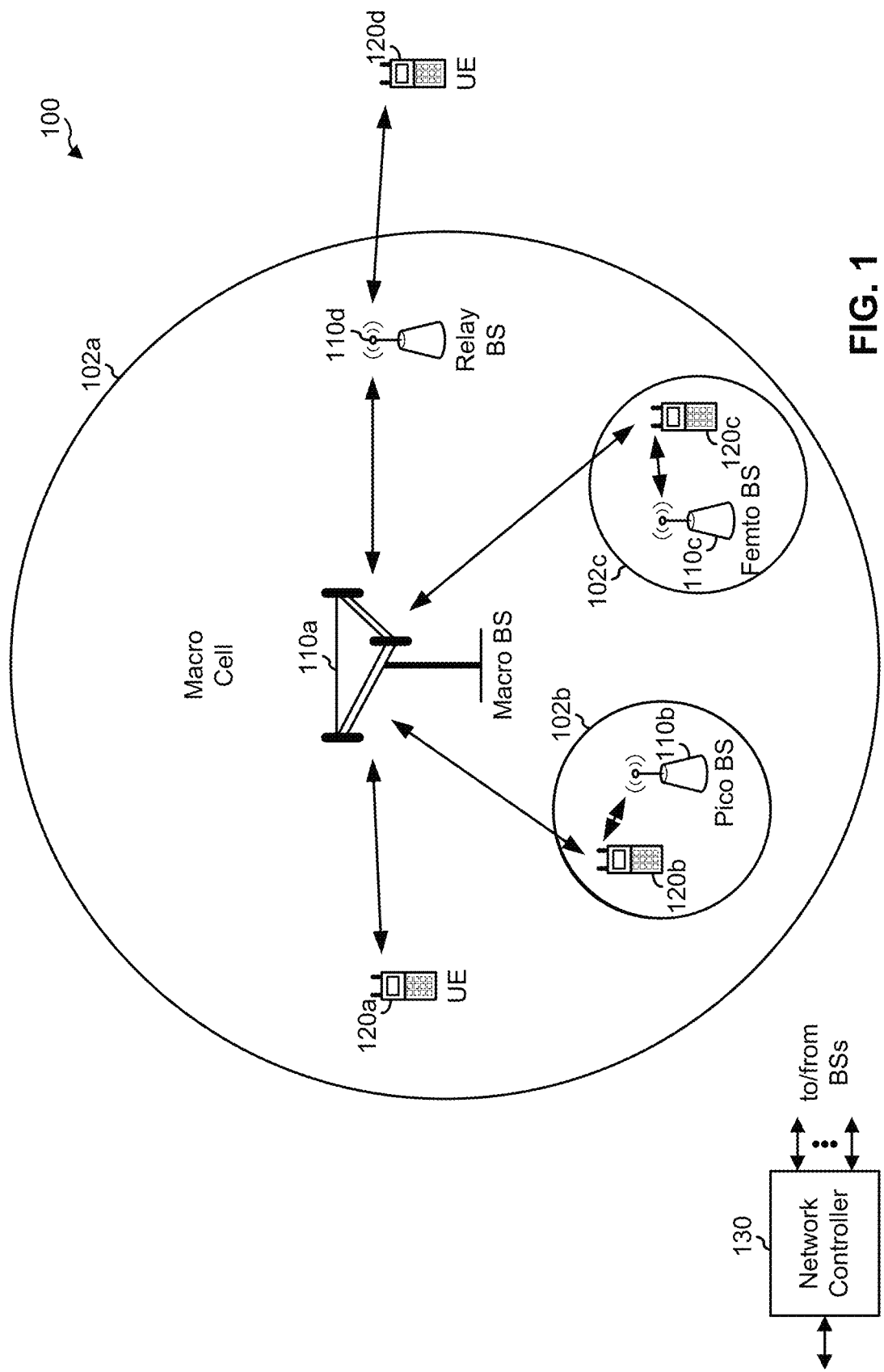
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
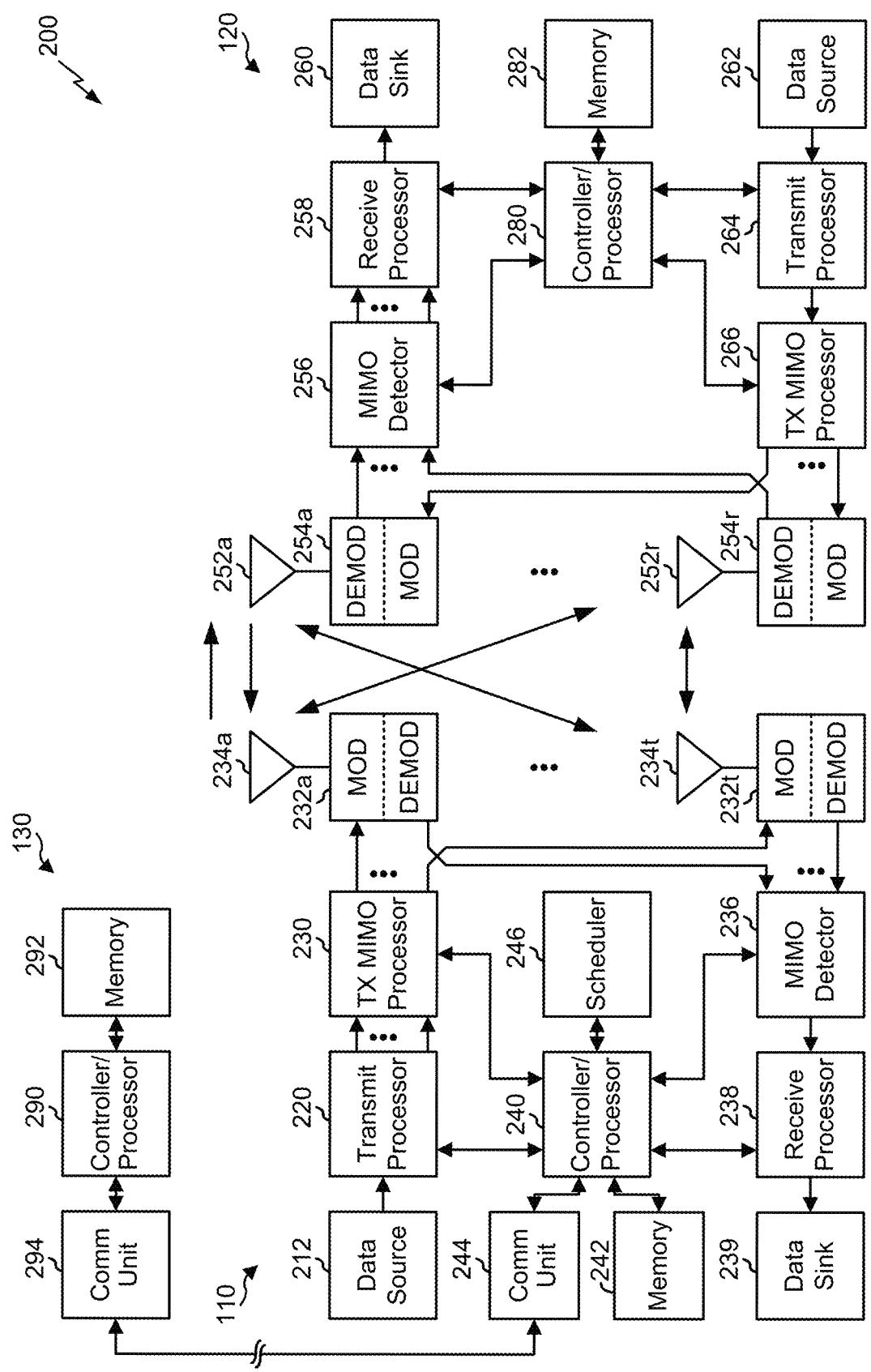
FIG. 2 is a block diagram conceptually illustrating an example of a base station in communication with a user equipment (UE) in a wireless communication network, in accordance with certain aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292. In some aspects, one or more components of UE 120 may be included in a housing.

Controller/processor 240 of BS 110, controller/processor 280 of UE 120, and/or any other component(s) of FIG. 2 may perform one or more techniques associated with radio resource management for multiple bandwidth parts, as described in more detail elsewhere herein. For example, controller/processor 240 of BS 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for determining a measurement regarding a plurality of bandwidth parts of a carrier of the UE 120 based at least in part on a measurement object associated with the measurement, means for determining a cell quality regarding the plurality of bandwidth parts based at least in part on the measurement object, means for transmitting a measurement report identifying the measurement and/or the cell quality based at least in part on the measurement object, means for determining that a threshold is satisfied with regard to a plurality of activated bandwidth parts of the UE 120, means for transmitting a message to cause a recovery or change with regard to the plurality of activated bandwidth parts, means for retransmitting the message based at least in part on not receiving a response to the message within a threshold length of time, and/or the like. In some aspects, such means may include one or more components of UE 120 described in connection with FIG. 2.

In some aspects, BS 110 may include means for configuring a measurement object of a UE 120 in a carrier, means for receiving, from the UE 120, information identifying a capability for switching from a first bandwidth part to a second bandwidth part of the plurality of bandwidth parts, means for configuring a switching pattern of the UE 120 based at least in part on the capability and/or the measurement object, and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3:
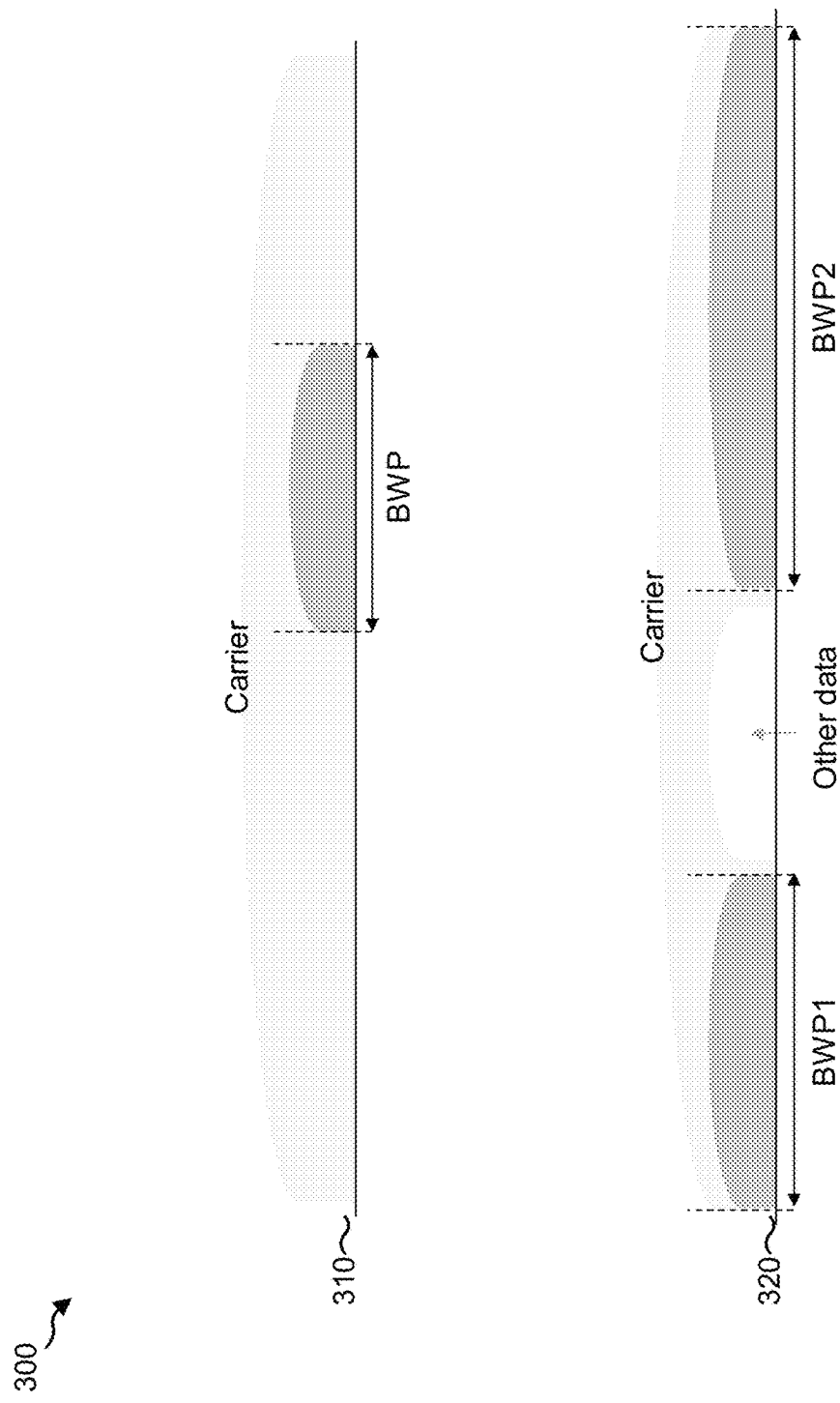
FIG. 3 is a diagram illustrating an example of bandwidth parts in an NR radio access technology, in accordance with various aspects of the present disclosure.

FIG. 3 is a diagram illustrating an example 300 of bandwidth parts in an NR radio access technology, in accordance with various aspects of the present disclosure.

In NR, a UE 120 may be apportioned one or more bandwidth parts. As shown by reference number 310, a bandwidth part may occupy part of a carrier (e.g., less than all of a carrier). By communicating using a bandwidth part for a UE 120, power and radio resources are conserved in comparison to communicating using an entire carrier for the UE 120. Furthermore, and as shown by reference number 320, in some aspects, a UE 120 may communicate using multiple bandwidth parts. Here, the UE 120 is associated with a first bandwidth part (BWP) (e.g., BWP1) and a second bandwidth part (e.g., BWP2). Note that other data, potentially not associated with the UE 120, can be carried between BWP1 and BWP2. In some cases, the resources between BWP1 and BWP2 may be unused (e.g., for a guard band, to reduce interference, based at least in part on scheduling constraints, etc.). In this way, versatility of air interface resources is improved by allowing non-contiguous bandwidth part assignment and assignment of a proper subset of a carrier for the UE 120 as a bandwidth part.

In some aspects, two or more bandwidth parts may partially or completely overlap in a carrier. Additionally, or alternatively, two or more bandwidth parts may be orthogonal to each other or may not overlap. Bandwidth parts can be used on the uplink and/or on the downlink. Numerology, frequency location, and/or bandwidth may be configured for each bandwidth part (e.g., via radio resource control (RRC) signaling). Bandwidth parts may be activated or deactivated (e.g., by explicit indication using downlink control information (DCI), a media access control (MAC) control element (CE), and/or the like). For example, a UE 120 may be configured with one or more configured bandwidth parts, and a subset of the configured bandwidth parts may be activated or deactivated for the UE 120 using signaling.

As indicated above, FIG. 3 is provided as an example. Other examples are possible and may differ from what was described with respect to FIG. 3.

Figure 4:
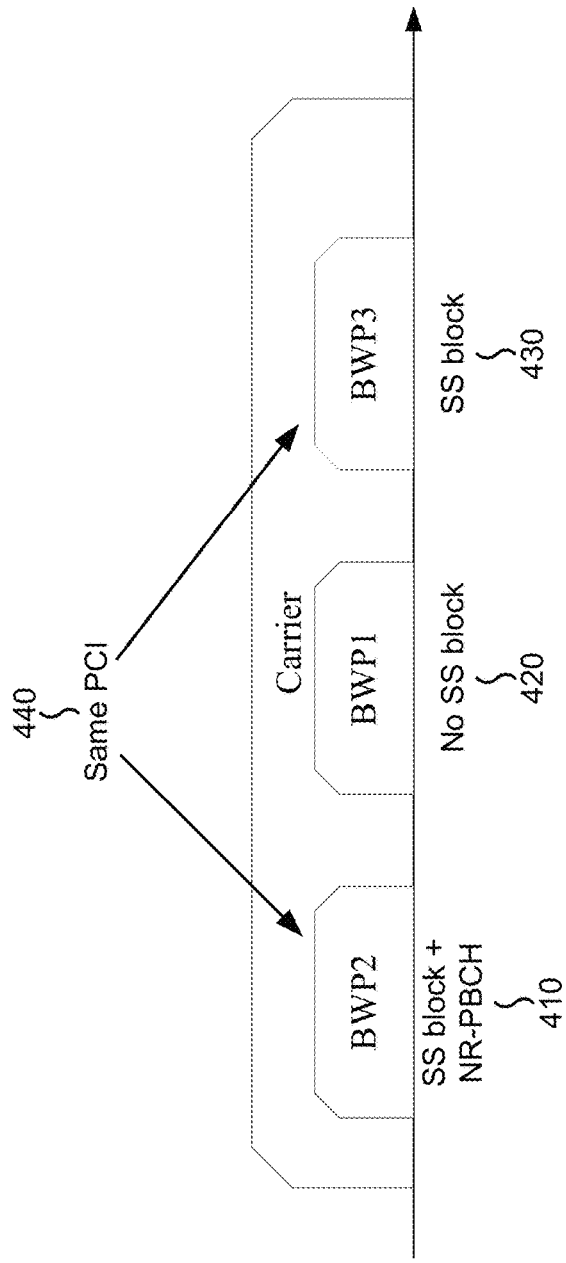
FIG. 4 is a diagram illustrating an example of information associated with bandwidth parts in an NR radio access technology, in accordance with various aspects of the present disclosure.

FIG. 4 is a diagram illustrating an example 400 of information associated with bandwidth parts in an NR radio access technology, in accordance with various aspects of the present disclosure.

As shown in FIG. 4, and by reference number 410, in some aspects, a bandwidth part (e.g., BWP2) may include a synchronization signal block and a physical broadcast channel, such as a NR physical broadcast channel (PBCH) (NR-PBCH). In some aspects, the PBCH or the NR-PBCH may be referred to as a cell defining synchronization signal block. "NR-PBCH" may be used interchangeably with "cell defining synchronization signal block" herein. The synchronization signal block and/or the NR-PBCH may be used for cell search and/or acquisition. In some aspects, the synchronization signal block may include a primary synchronization signal (PSS), a secondary synchronization signal (SSS), a NR PSS (NPSS), a NR SSS (NSSS), and/or the like. In some aspects, the bandwidth of a single bandwidth part may be at least as large as the synchronization signal block.

As shown by reference number 420, in some aspects, a bandwidth part (e.g., BWP1) may not include a synchronization signal block and/or a PBCH. This may provide additional bandwidth for transmission of data in a situation where it is not necessary to synchronize with regard to the bandwidth part, and may enable the usage of BWPs in a carrier that does not include a synchronization signal block.

As shown by reference number 430, in some aspects, a bandwidth part (e.g., BWP3) may include a synchronization signal block and not a NR-PBCH. Additionally, or alternatively, a bandwidth part may include a NR-PBCH and not a synchronization signal block. As shown by reference number 440, bandwidth parts of a single carrier that include a synchronization signal block may be configured with the same physical cell identifier corresponding to the carrier. Otherwise, a UE 120 may not be able to synchronize with the single carrier, since the UE 120 may be confused as to whether the synchronization signal blocks are associated with the same carrier.

As indicated above, FIG. 4 is provided as an example. Other examples are possible and may differ from what was described with respect to FIG. 4.

A UE 120 may communicate with a BS 110 using multiple different uplink and/or downlink bandwidth parts. The BS 110 may configure cell quality measurement for the UE 120 using a measurement object. However, configuration of measurement objects and cell quality measurement for a UE 120 associated with multiple bandwidth parts may present certain problems. For example, in a case where the multiple bandwidth parts include multiple synchronization signal blocks, it may be difficult to configure a carrier-specific measurement object with regard to the multiple synchronization signal blocks. Additionally, or alternatively, it may be difficult to determine a cell quality measurement for multiple bandwidth parts, since performing multiple cell measurements may use significant power and UE resources. Another challenge of radio resource management for multiple bandwidth parts may relate to addition and release of bandwidth parts. For example, the UE 120 may need to perform BWP-specific measurement and reporting, and switching from one bandwidth part to another bandwidth part may involve variable delay or latency (e.g., based at least in part on different signaling configurations, bandwidth separations, and/or the like). Additionally, or alternatively, the UE 120 may benefit from a mechanism to quickly recover an active bandwidth part that has been lost or dropped.

Some techniques and apparatuses described herein may provide for radio resource management of UEs with multiple bandwidth parts. For example, some techniques and apparatuses described herein provide for configuration of a single measurement object per carrier to identify measurement configurations and reporting configurations for a plurality of bandwidth parts of the carrier. Some techniques and apparatuses described herein provide measurement and reporting based at least in part on such measurement objects. Some techniques and apparatuses described herein provide for determination of a timing pattern for switching bandwidth parts based at least in part on a switching capability of a UE 120 associated with the bandwidth parts. Some techniques and apparatuses described herein provide for detection of a failed or dropped bandwidth part, and signaling for a recovery or switching process based at least in part on the detection.

In this way, accuracy and reliability of measurement for multiple bandwidth parts is improved. Furthermore, resource and power consumption for measurement of multiple bandwidth parts is reduced. Still further, graceful recovery from a failed bandwidth part is provided. Even further, more accurate scheduling of switching between bandwidth parts is achieved.

Figure 5A:
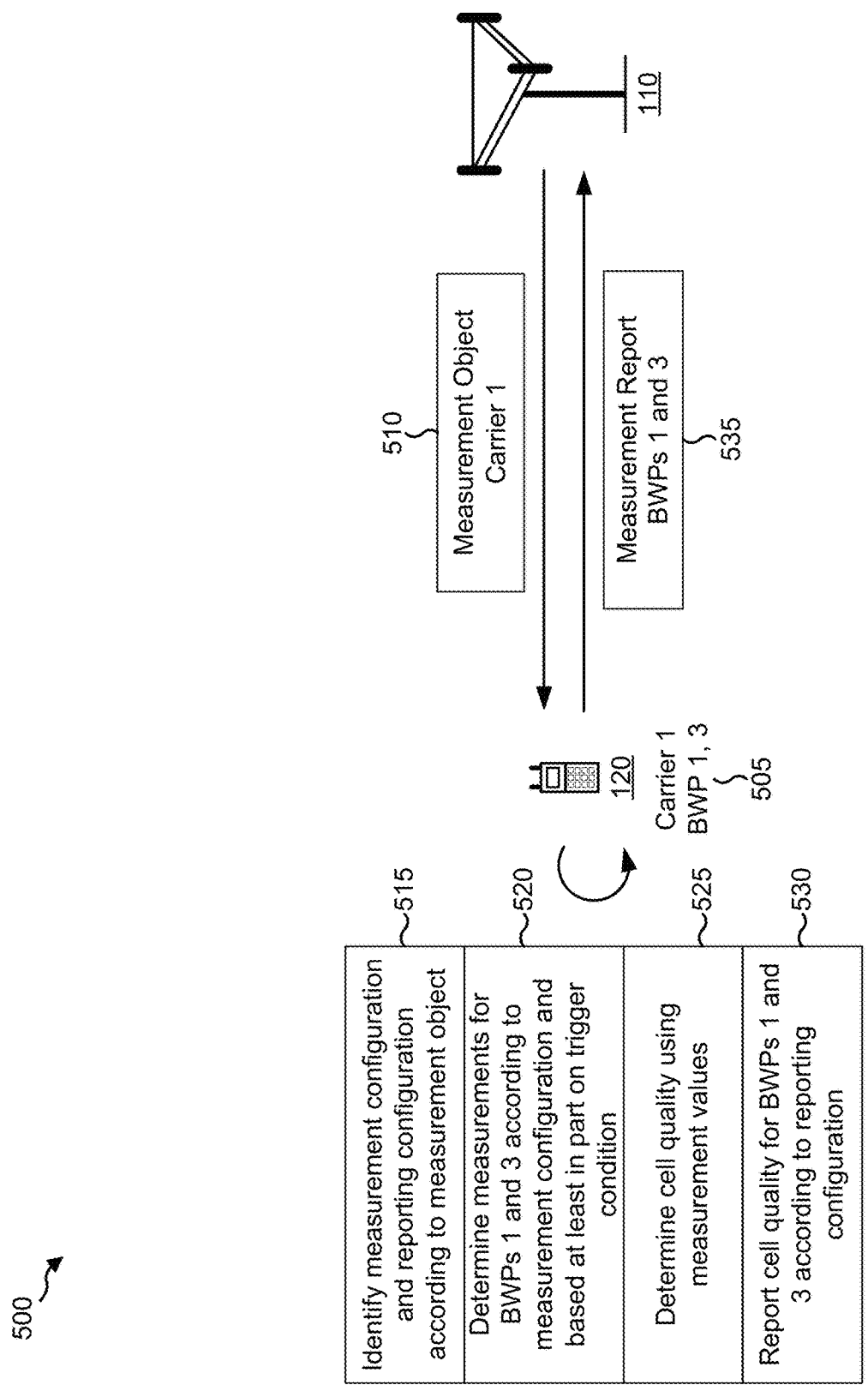
FIGS. 5A and 5B are diagrams illustrating examples of radio resource management for multiple bandwidth parts, in accordance with various aspects of the present disclosure.
Figure 5B:
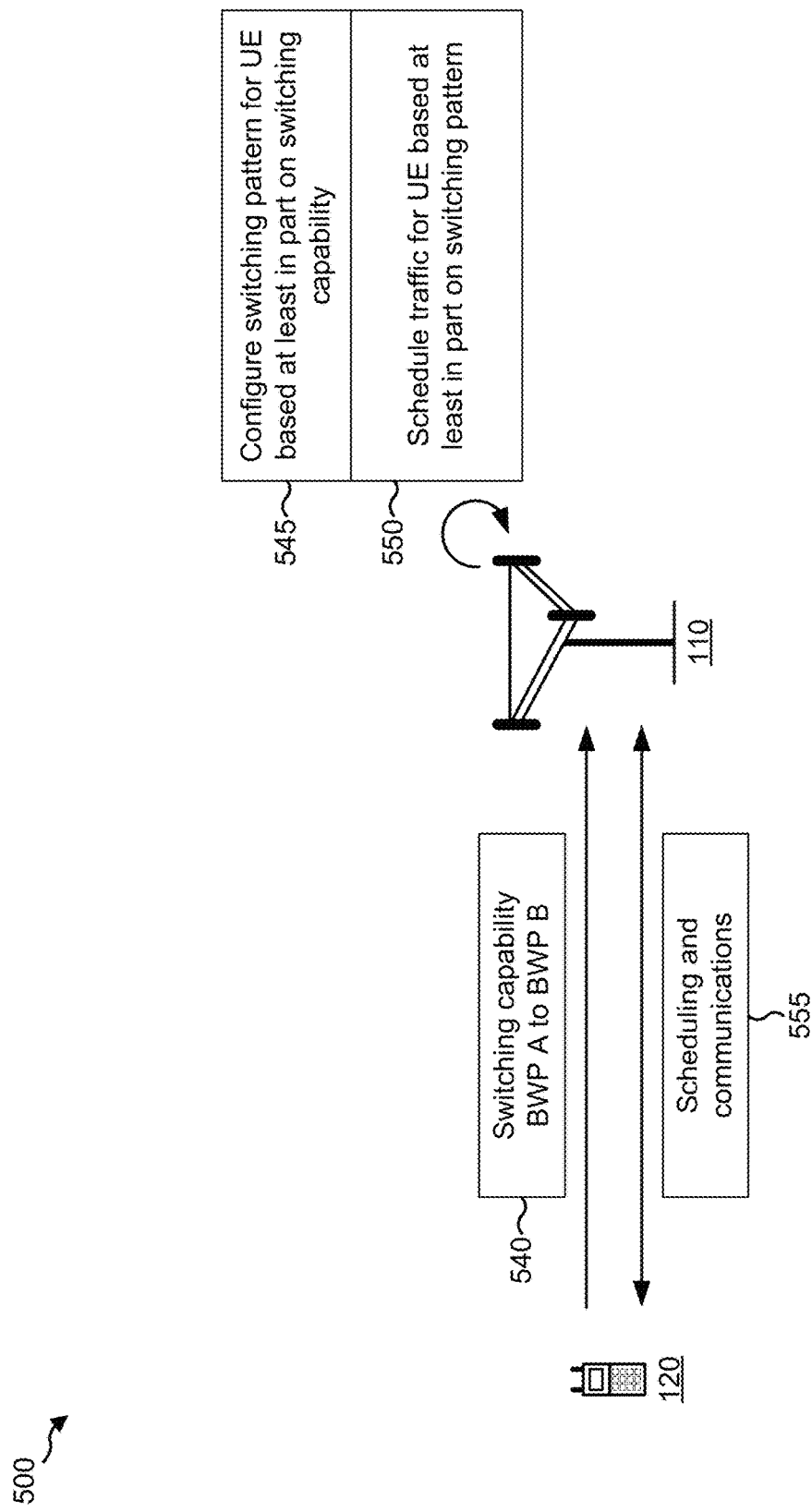

FIGS. 5A and 5B are diagrams illustrating examples 500 of radio resource management for multiple bandwidth parts, in accordance with various aspects of the present disclosure. As shown in FIG. 5A, and by reference number 505, a UE 120 may be associated with a carrier (e.g., Carrier 1) and multiple different bandwidth parts (e.g., bandwidth parts 1 and 3). In some aspects, bandwidth parts 1 and 3 may be non-contiguous. In some aspects, bandwidth parts 1 and 3 may be contiguous. In some aspects, bandwidth part 1 and/or bandwidth part 3 may include a synchronization signal block. Additionally, or alternatively, bandwidth part 1 and/or bandwidth part 3 may include a NR-PBCH. For example, only one of bandwidth part 1 or bandwidth part 3 may include a NR-PBCH. In some aspects, one bandwidth part per cell may include an NR-PBCH. In some aspects, one bandwidth part, of the bandwidth parts associated with UE 120 (e.g., active bandwidth parts or configured bandwidth parts of UE 120), may include a NR-PBCH. In some aspects, the NR-PBCH may be considered as the time reference of a cell associated with the carrier. Bandwidth parts 1 and/or 3 may be active bandwidth parts of the UE 120, and/or may be configured bandwidth parts of the UE 120 that have not been activated or have been deactivated.

As shown by reference number 510, a BS 110 may provide a measurement object for Carrier 1 to the UE 120. For example, the BS 110 may configure the measurement object. The measurement object may identify measurement configurations, reporting configurations, and/or a cell quality derivation configuration for Carrier 1. For example, a measurement configuration may identify how the UE 120 is to perform measurements (e.g., frequency, bandwidth, location of a reference signal, filtering techniques, and/or the like). A reporting configuration may identify criteria used by the UE 120 to trigger transmission of a measurement report, and may identify qualities or values that the UE 120 should include in the measurement report. For example, the reporting configuration may identify a reference signal to measure (e.g., a synchronization signal or reference signal, such as a channel state information (CSI) reference signal (CSI-RS)), a periodical trigger or event-based trigger, an event type (e.g., an A1 event, an A2 event, an A3 event, an A4 event, an A5 event, an A6 event, or another type of event), a threshold for the indicated event type, a reporting type, and/or the like. In some aspects, the event type triggers may be similar to or identical to the event type triggers known in LTE. The cell quality derivation configuration may identify how to identify a cell quality value based at least in part on values of the measurements. By defining measurement configurations, reporting configurations, and cell quality derivations using a single measurement object for Carrier 1, confusion is avoided that might otherwise be caused by the measurement of multiple, different bandwidth parts.

As shown by reference number 515, the UE 120 may identify one or more measurement configurations and one or more reporting configurations according to the measurement object. For example, the UE 120 may identify one or more measurement configurations that correspond to bandwidth parts 1 and/or 3 (e.g., based at least in part on an identifier of bandwidth parts 1 and/or 3), and may identify one or more reporting configurations that correspond to bandwidth parts 1 and/or 3 (e.g., based at least in part on an identifier of bandwidth parts 1 and/or 3). In some aspects, the UE 120 may identify a reporting configuration based at least in part on a measurement configuration. For example, the measurement configuration may include a pointer to the corresponding reporting configuration. For a more detailed description of contents of a measurement object, refer to the description accompanying FIGS. 10A and 10B, below.

As shown by reference number 520, the UE 120 may determine one or more measurements for bandwidth parts 1 and 3 according to the measurement configuration and based at least in part on a trigger condition. For example, when a trigger condition is satisfied (e.g., for a threshold length of time), the UE 120 may perform measurements to generate a measurement report. In some aspects, the UE 120 may determine the measurement using a layer 1 filtering technique (e.g., physical layer). For example, for serving cell management, layer 1 filtering may be used. In some aspects, the UE 120 may determine the measurement using a layer 3 (e.g., radio resource control layer) filtering technique. For example, for mobility management, a layer 3 filtering technique may be used for a bandwidth part that includes the NR-PBCH.

In some aspects, the UE 120 may generate a measurement report periodically. The UE 120 may identify the trigger condition and/or a periodicity for transmitting a measurement report based at least in part on the reporting configuration. The UE 120 may determine the one or more measurements based at least in part on a synchronization signal (e.g., a PSS, SSS, NPSS, NSSS, etc.), a reference signal (e.g., a CSI-RS or a similar reference signal), and/or the like. For example, the measurement configuration of the UE 120 may indicate which type of signal is to be used.

In some aspects, the UE 120 may determine a combined measurement value for multiple, different bandwidth parts. For example, the UE 120 may determine an average measurement value of the multiple, different bandwidth parts. Additionally, or alternatively, the UE 120 may determine a maximum measurement value of the multiple, different bandwidth parts. Additionally, or alternatively, the UE 120 may determine an average or maximum measurement value of a plurality of activated bandwidth parts. Additionally, or alternatively, the UE 120 may determine an average or maximum measurement value for a plurality of configured (e.g., activated or deactivated) bandwidth parts.

Additionally, or alternatively, the UE 120 may determine a measurement value for a single bandwidth part. For example, the UE 120 may determine a measurement value for a single bandwidth part that includes a NR-PBCH. This may be particularly beneficial when only one NR-PBCH is transmitted per carrier. In some aspects, the UE 120 may determine a measurement value for a single bandwidth part that is overlapped between a serving cell and a target cell after coordination between the serving cell and the target cell. This may be beneficial when the UE 120 is to handover from the serving cell to the target cell. In this way, the UE 120 may determine a combined measurement value based at least in part on multiple, different bandwidth parts, which provides for determination of a UE-specific (e.g., rather than BWP-specific) cell quality value. In some aspects, the UE 120 may determine the measurement value for radio resource management (RRM) of a serving cell. For example, the UE 120 may perform RRM based at least in part on the bandwidth part that includes the NR-PBCH, irrespective of which bandwidth parts are activated.

As shown by reference number 525, the UE 120 may determine a cell quality using the measurement values. For example, the UE 120 may determine the cell quality using a combined measurement value (e.g., when a combined measurement value is determined). Additionally, or alternatively, the UE 120 may determine the cell quality using a measurement value for a single bandwidth part, such as a bandwidth part having a NR-PBCH or a bandwidth part shared between a target cell and a serving cell. In some aspects, the UE 120 may determine, for example, a channel quality indicator (CQI), a reference signal received power (RSRP), a reference signal received quality (RSRQ), a received signal strength indicator (RSSI), a combination of the above measurement values and/or cell quality values, and/or the like.

As shown by reference number 530, the UE 120 may report the cell quality (e.g., and/or the measurement values) for bandwidth parts 1 and 3 according to the reporting configuration. In some aspects, the UE 120 may report cell quality values for all configured (or activated) bandwidth parts. In some aspects, the UE 120 may report measurement values for a strongest X bandwidth parts, where X is any integer. In such a case, the value of X may be configurable and/or variable. In some aspects, the UE 120 may report pairs of serving/neighbor cell quality values for a single frequency location. In some aspects, the UE 120 may report a difference between a serving cell and neighbor cell in a same frequency location. The UE 120 may perform any of the above reporting on a periodic basis and/or an event-triggered basis, as well as for a synchronization signal and/or a reference signal.

As shown by reference number 535, the UE 120 may provide a measurement report regarding bandwidth parts 1 and 3. In this way, the UE 120 determines a UE-specific (e.g., rather than BWP-specific) cell quality value based at least in part on a single measurement object, and reports the cell quality value to the BS 110. Thus, simplicity and efficiency of measurement and reporting for UEs with multiple bandwidth parts is improved.

FIG. 5B illustrates an example 500 of indicating a switching capability of the UE 120 and configuring a switching pattern of the UE 120 according to the switching capability. For the purpose of FIG. 5B, assume that the operations described in FIG. 5A have been performed. However, the operations described in FIG. 5B need not be preceded by the operations described in FIG. 5A, and the operations described in FIG. 5B may be performed independently of the operations described in FIG. 5A.

As shown in FIG. 5B, and by reference number 540, the UE 120 may report a switching capability from a first bandwidth part (e.g., BWP A) to a second bandwidth part (e.g., BWP B). In some aspects, the switching capability may identify a latency associated with switching from a first bandwidth part to a second bandwidth part. Additionally, or alternatively, the switching capability may identify a latency associated with switching between different types of bandwidth parts. For example, the switching capability may relate to uplink bandwidth parts and/or downlink bandwidth parts, may identify a latency for switching between a bandwidth part associated with a first signaling type (e.g., DCI, MAC-CE, etc.) and a second signaling type (e.g., DCI, MAC-CE, etc.), may indicate a delay based at least in part on CQI, may indicate a delay based at least in part on radio frequency delay, and/or the like.

As shown by reference number 545, the BS 110 may configure a switching pattern for the UE 120 based at least in part on the switching capability. For example, the switching pattern may identify scheduling and/or timing for switching from a first bandwidth part to a second bandwidth part. Additionally, or alternatively, the switching pattern may identify a cycle (e.g., a frequency hopping cycle and/or the like) that is configured based at least in part on the switching capability. As a particular example, the switching pattern may be configured based at least in part on a latency for switching between two bandwidth parts so that sufficient time is provided for switching between the two bandwidth parts.

As shown by reference number 550, the BS 110 may schedule traffic for the UE 120 based at least in part on the switching pattern, and, as shown by reference number 555, the BS 110 and the UE 120 may communicate based at least in part on the scheduled pattern. For example, the BS 110 may schedule traffic on two or more bandwidth parts based at least in part on the switching pattern in a fashion that provides adequate time for switching between the two or more bandwidth parts. In this way, efficiency of scheduling is improved and gaps between transmissions on different bandwidth parts may be more accurately determined.

As indicated above, FIGS. 5A and 5B are provided as examples. Other examples are possible and may differ from what was described with respect to FIGS. 5A and 5B.

Figure 6:
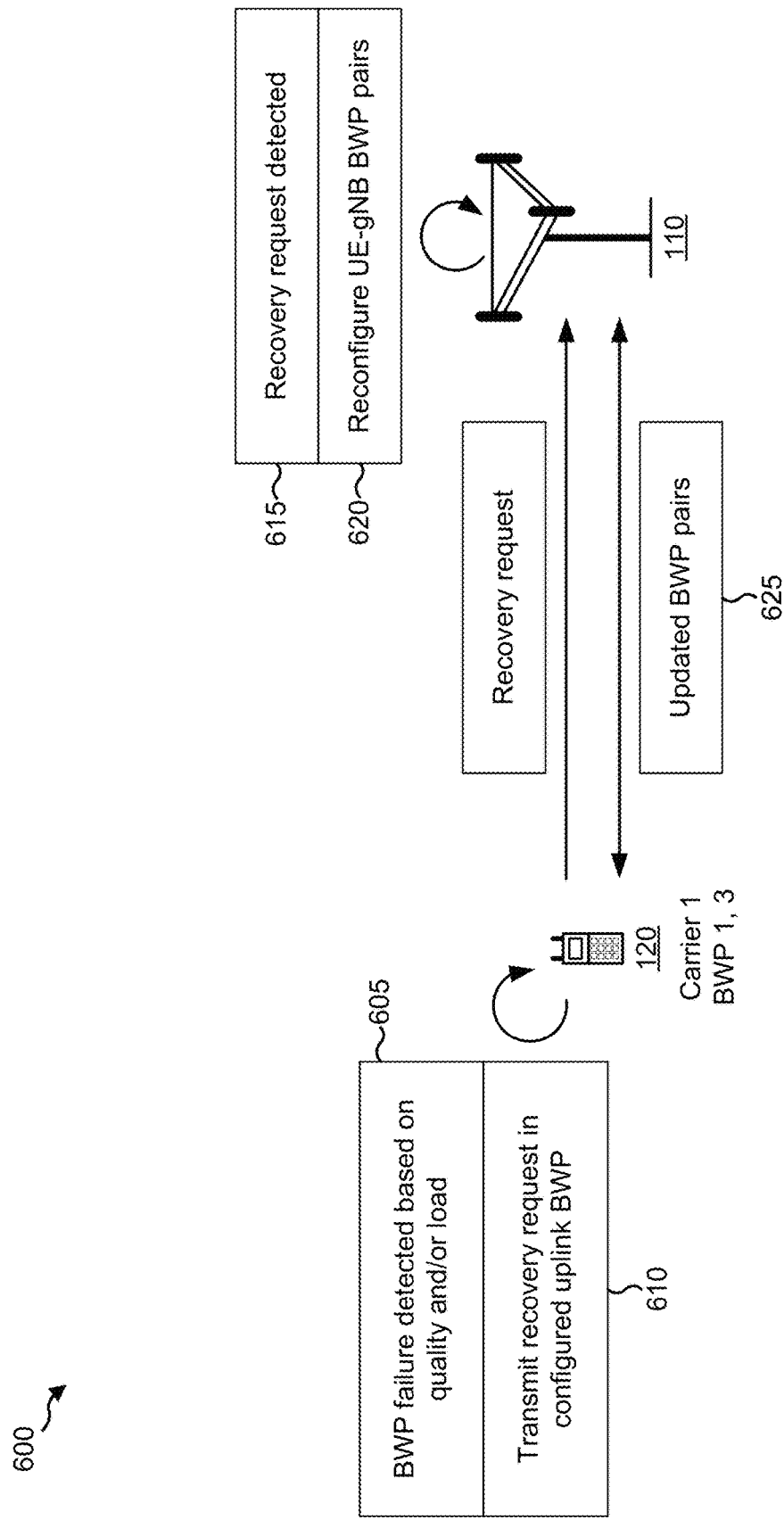
FIG. 6 is a diagram illustrating an example of radio resource management for multiple bandwidth parts in a case of a bandwidth part failure, in accordance with various aspects of the present disclosure.

FIG. 6 is a diagram illustrating an example 600 of radio resource management for multiple bandwidth parts in a case of a bandwidth part failure, in accordance with various aspects of the present disclosure. The operations described in connection with FIG. 6 may be performed independently of or in conjunction with the operations described in connection with FIGS. 5A and 5B.

As shown in FIG. 6, and by reference number 605, a UE 120 may detect a condition of a plurality of bandwidth parts. In some aspects, the UE 120 may detect the condition based at least in part on a quality associated with the plurality of bandwidth parts (e.g., a measurement value, a cell quality, a CQI, a throughput, a signal strength, or a similar value), such as a quality determined according to the operations described in connection with FIG. 5A, above. Additionally, or alternatively, the UE 120 may detect the condition based at least in part on a load (e.g., a threshold resource availability, a threshold signal to noise ratio, or a similar value). In some aspects, the UE 120 may detect the failure based at least in part on a time threshold or a timer. For example, the UE 120 may detect the condition when a failure condition has been satisfied for a threshold length of time.

As shown by reference number 610, the UE 120 may transmit a recovery request based at least in part on detecting the condition. In some aspects, and as shown, the UE 120 may transmit the recovery request in a particular bandwidth part, such as a configured (e.g., pre-configured, fallback, etc.) uplink bandwidth part. In some aspects, the UE 120 may receive information indicating a bandwidth part and/or resource in which the recovery request is to be transmitted. For example, the information may be received in a remaining system information (RMSI) carried in an active downlink bandwidth part. In some aspects, the UE 120 may transmit the recovery request as a random access resource. For example, the UE 120 may transmit the recovery request in a physical random access channel (PRACH) resource. In such a case, the UE 120 may transmit the recovery request based at least in part on a contention-based random access channel (RACH) procedure. In some aspects, the BS 110 may configure the RACH procedure for the UE 120 using a RMSI. For example, the BS 110 may configure the RACH procedure for an uplink bandwidth if a linked downlink bandwidth part (e.g., of a serving cell, which includes the RMSI) carries the NR-PBCH or the synchronization signal block for the serving cell.

As shown by reference number 615, the BS 110 may detect the recovery request, and, as shown by reference number 620, the BS 110 may reconfigure a bandwidth part pair between the UE 120 and a gNB (e.g., the BS 110 or another BS). For example, the BS 110 may identify a bandwidth part available to the UE 120 (e.g., a configured bandwidth part or a bandwidth part that has not yet been configured for the UE 120). As shown by reference number 625, the BS 110 may transmit information identifying the updated bandwidth part pair to the UE 120, and the UE 120 and the BS 110 may communicate using the updated bandwidth part pair. When the bandwidth part pair is a configured bandwidth part pair, the BS 110 may activate the bandwidth part pair. When the bandwidth part pair is an unconfigured bandwidth part pair, the BS 110 may configure and activate the bandwidth part pair. In this way, the UE 120 detects a failure of a plurality of bandwidth parts and configures activation of another pair of bandwidth parts. In some aspects, when the UE 120 does not receive a response to the recovery request within a threshold length of time, the UE 120 may retransmit the recovery request.

As indicated above, FIG. 6 is provided as an example. Other examples are possible and may differ from what was described with respect to FIG. 6.

Figure 7:
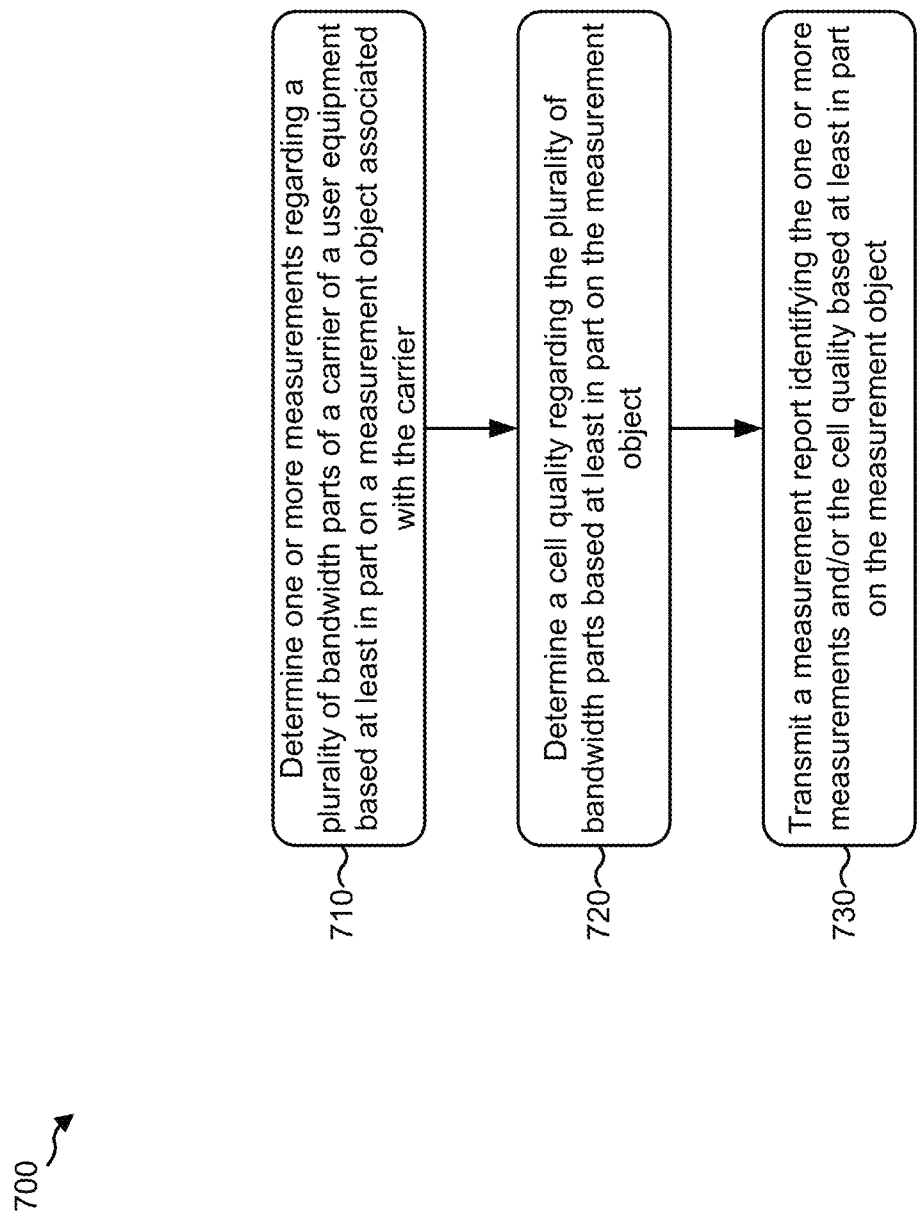
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs radio resource management for multiple bandwidth parts.

As shown in FIG. 7, in some aspects, process 700 may include determining one or more measurements regarding a plurality of bandwidth parts of a carrier of a user equipment based at least in part on a measurement object associated with the carrier (block 710). For example, the user equipment (e.g., using controller/processor 280 and/or the like) may determine a measurement (e.g., one or more measurement values) regarding a plurality of bandwidth parts. The plurality of bandwidth parts may be included in (e.g., may be proper subsets of) a carrier of the user equipment. The user equipment may determine the measurement based at least in part on a measurement object associated with the carrier. For example, the measurement object may have a one-to-one correspondence with the carrier.

As shown in FIG. 7, in some aspects, process 700 may include determining a cell quality regarding the plurality of bandwidth parts based at least in part on the measurement object (block 720). For example, the user equipment (e.g., using controller/processor 280 and/or the like) may determine a cell quality value. The cell quality value may relate to the plurality of bandwidth parts. For example, the cell quality value may be based at least in part on a combination of measurement values associated with the plurality of bandwidth parts. The user equipment may determine the cell quality value based at least in part on the measurement object. For example, the measurement object may store configuration information indicating how to derive the cell quality value from the measurement values.

As shown in FIG. 7, in some aspects, process 700 may include transmitting a measurement report identifying the one or more measurements and/or the cell quality based at least in part on the measurement object (block 730). For example, the user equipment (e.g., using controller/processor 280, transmit processor 264, TX MIMO processor 266, MOD 254, antenna 252, and/or the like) may transmit a measurement report. The measurement report may identify the measurement values and/or the cell quality based at least in part on the measurement object. For example, the measurement report may be formatted according to a reporting configuration identified in the measurement object.

Process 700 may include additional aspects, such as any single aspect or any combination of aspects described below and/or in connection with one or more other processes described elsewhere herein.

In some aspects, the measurement object identifies multiple, different measurement configurations corresponding to respective bandwidth parts of the plurality of bandwidth parts.

In some aspects, the measurement object identifies multiple, different reporting configurations for the measurement report, the multiple, different reporting configurations correspond to respective bandwidth parts of the plurality of bandwidth parts, and the user equipment is configured to identify a particular reporting configuration associated with at least one bandwidth part of the plurality of bandwidth parts of the user equipment.

In some aspects, a particular measurement configuration, of the multiple, different measurement configurations, that corresponds to the at least one bandwidth part, includes a pointer indicating that the particular reporting configuration is associated with the at least one bandwidth part. In some aspects, the particular reporting configuration includes information indicating that the particular reporting configuration is associated with the particular measurement configuration for the at least one bandwidth part. In some aspects, when a bandwidth part, of the plurality of bandwidth parts, includes a synchronization signal, a measurement configuration for the bandwidth part identifies at least one of a center frequency associated with the bandwidth part, a frequency offset associated with a synchronization signal in the bandwidth part, or a bandwidth associated with the bandwidth part.

In some aspects, when a bandwidth part, of the plurality of bandwidth parts, does not include a synchronization signal, a measurement configuration for the bandwidth part identifies at least one of a center frequency associated with the bandwidth part, a pointer associated with a synchronization signal in another bandwidth part or another carrier, a bandwidth associated with the bandwidth part, or a reference signal configuration for the bandwidth part.

In some aspects, the cell quality is determined based at least in part on a combination of two or more measurements of the one or more measurements for the plurality of bandwidth parts. In some aspects, the combination includes an average measurement or a maximum measurement for the plurality of bandwidth parts.

In some aspects, the cell quality is determined based at least in part on a measurement in a particular one of the plurality of bandwidth parts. In some aspects, the plurality of bandwidth parts is a plurality of configured bandwidth parts. In some aspects, the plurality of bandwidth parts is a plurality of activated bandwidth parts. In some aspects, the cell quality is determined based at least in part on a measurement in a bandwidth part that includes a physical broadcast channel. In some aspects, the physical broadcast channel is an only physical broadcast channel of a cell that provides the carrier. In some aspects, the cell quality is determined based at least in part on a measurement for a bandwidth part with a pre-configured reference synchronization signal. In some aspects, the physical broadcast channel is provided on a single bandwidth part of the plurality of bandwidth parts.

In some aspects, the cell quality is determined based at least in part on a measurement for a bandwidth part that overlaps between a serving cell and a target cell. In some aspects, the measurement report includes the one or more measurements regarding the plurality of bandwidth parts. In some aspects, the measurement report includes a value, of values of the one or more measurements, regarding a subset of the plurality of bandwidth parts that includes one or more strongest bandwidth parts. In some aspects, the measurement report includes values of paired measurements for a bandwidth part of the plurality of bandwidth parts that overlaps between a serving cell and a target cell.

In some aspects, the measurement report includes a difference between a bandwidth part associated with a serving cell and a bandwidth part associated with a neighbor cell. In some aspects, the measurement report is at least one of a periodical report or a triggered report, wherein the measurement report is based at least in part on a reporting configuration. In some aspects, the measurement report is triggered based at least in part on a cell quality threshold. In some aspects, the cell quality threshold is based at least in part on a first threshold for a synchronization signal or a second threshold for a reference signal, wherein the first threshold or the second threshold is used based at least in part on a reporting configuration of the user equipment. In some aspects, the one or more measurements are determined based at least in part on a physical layer filtering technique.

In some aspects, the one or more measurements are determined based at least in part on a radio resource control layer filtering technique. In some aspects, the one or more measurements are selectively determined based at least in part on a synchronization signal or a reference signal according to a reporting configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with various aspects of the present disclosure. Example process 800 is an example where a base station (e.g., BS 110) performs radio resource management for multiple bandwidth parts.

As shown in FIG. 8, in some aspects, process 800 may include configuring a measurement object of a user equipment in a carrier, wherein the measurement object includes multiple measurement configurations for a plurality of bandwidth parts and corresponding reporting configurations for the plurality of bandwidth parts (block 810). For example, the base station (e.g., using controller/processor 240, transmit processor 220, TX MIMO processor 230, MOD 232, antenna 234, and/or the like) may configure a measurement object of a user equipment in a carrier. The measurement object may correspond to the carrier. The measurement object may include multiple measurement configurations for a plurality of bandwidth parts of the carrier, and may include corresponding reporting configurations for the plurality of bandwidth parts (e.g., the reporting configurations may correspond to the measurement configurations and/or the bandwidth parts).

As shown in FIG. 8, in some aspects, process 800 may include receiving, from the user equipment, information identifying a capability for switching from a first bandwidth part to a second bandwidth part of the plurality of bandwidth parts (block 820). For example, the base station (e.g., using antenna 234, DEMOD 232, MIMO detector 236, receive processor 238, controller/processor 240, and/or the like) may receive information identifying a capability for switching from a first bandwidth part (or a first bandwidth part type) to a second bandwidth part (or a second bandwidth part type). In some aspects, the information may identify a latency and/or the like.

As shown in FIG. 8, in some aspects, process 800 may include configuring a switching pattern of the user equipment based at least in part on the capability and/or the measurement object (block 830). For example, the base station may configure (e.g., using controller/processor 240, transmit processor 220, TX MIMO processor 230, MOD 232, antenna 234, and/or the like) a switching pattern of the user equipment. The base station may configure the switching pattern based at least in part on the capability and/or the measurement object. For example, the switching pattern may be configured to allocate sufficient time for switching between bandwidth parts and/or to reduce unnecessary time associated with switching between bandwidth parts.

Process 800 may include additional aspects, such as any single aspect or any combination of aspects described below and/or in connection with one or more other processes described elsewhere herein.

In some aspects, the capability includes at least a latency for switching from the first bandwidth part to the second bandwidth part. In some aspects, the capability is for switching between downlink bandwidth parts. In some aspects, the capability is for switching between uplink bandwidth parts. In some aspects, the capability is based at least in part on a signaling approach for the first bandwidth part and a signaling approach for the second bandwidth part.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with various aspects of the present disclosure. Example process 900 is an example where a UE (e.g., UE 120) performs radio resource management for multiple bandwidth parts.

As shown in FIG. 9, in some aspects, process 900 may include determining that a threshold is satisfied with regard to a plurality of activated bandwidth parts of the user equipment (block 910). For example, the user equipment (e.g., using controller/processor 280 and/or the like) may determine that a threshold is satisfied with regard to a plurality of activated bandwidth parts of the user equipment. The threshold may relate to cell quality, a measurement value, a load on the plurality of activated bandwidth parts, and/or the like.

As shown in FIG. 9, in some aspects, process 900 may include transmitting a message to cause a recovery or change with regard to the plurality of activated bandwidth parts (block 920). For example, the user equipment (e.g., using controller/processor 280, transmit processor 264, TX MIMO processor 266, MOD 254, antenna 252, and/or the like) may transmit a message to cause a recovery or change with regard to the plurality of activated bandwidth parts. The recovery may be scheduled and/or configured by a base station (e.g., the BS 110). For example, the BS 110 may determine a pair of bandwidth parts (e.g., two or more bandwidth parts) to replace the plurality of activated bandwidth parts, and may configure the user equipment to be switched to the pair of bandwidth parts.

Process 900 may include additional aspects, such as any single aspect or any combination of aspects described below and/or in connection with one or more other processes described elsewhere herein.

In some aspects, the message is a contention-based random access message In some aspects, the threshold relates to at least one of a signal quality value or a load associated with the plurality of activated bandwidth parts. In some aspects, a resource for the message in an uplink bandwidth part is indicated in a remaining system information of a bandwidth part of the plurality of activated bandwidth parts. In some aspects, the message is transmitted in a preconfigured resource of an uplink bandwidth part. In some aspects, the user equipment may retransmit the message based at least in part on not receiving a response to the message within a threshold length of time. In some aspects, determining that the threshold is satisfied comprises determining that the threshold is satisfied for a threshold length of time.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10A:
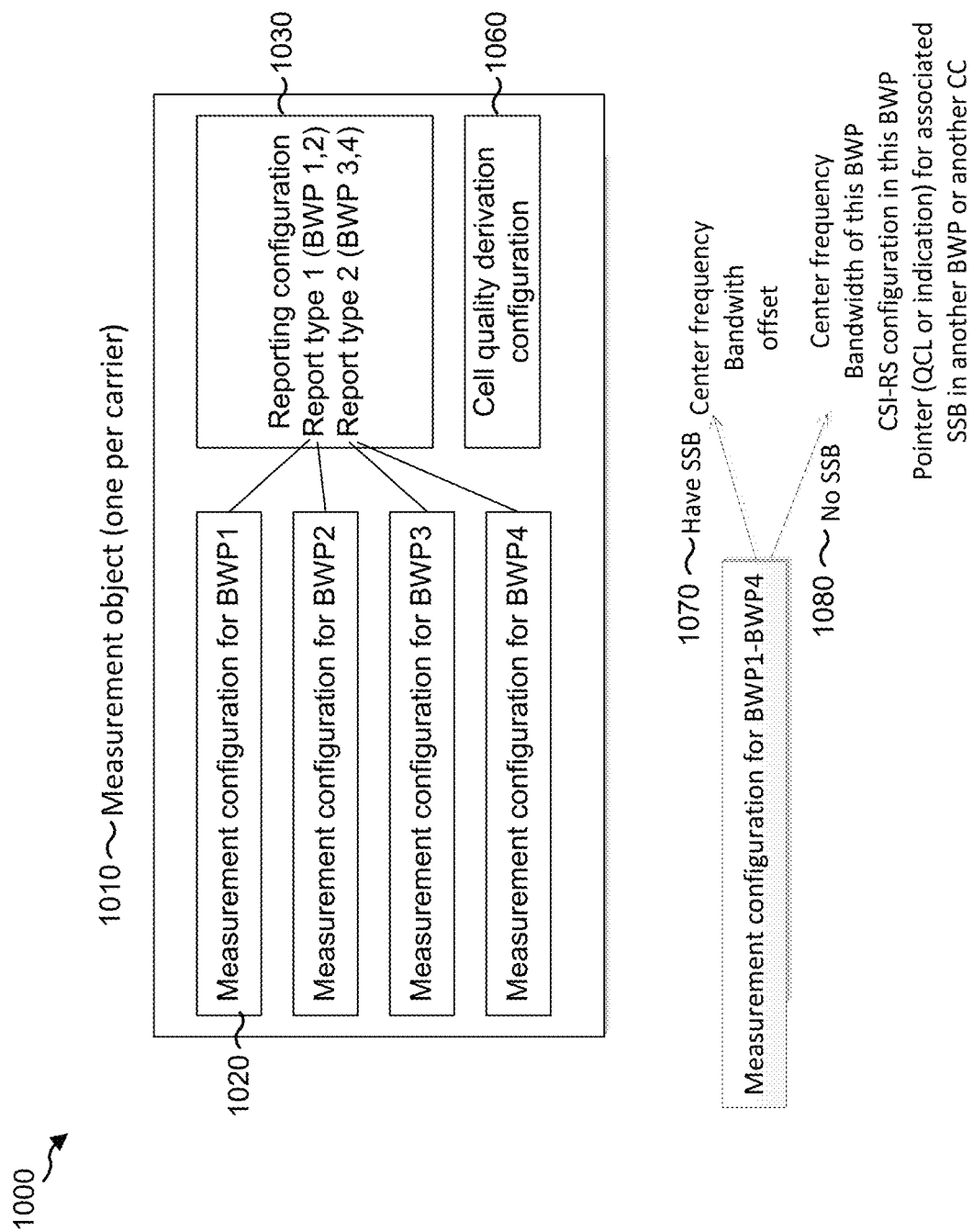
FIGS. 10A and 10B are diagrams illustrating examples of a measurement object relating to multiple, different bandwidth parts, in accordance with various aspects of the present disclosure.
Figure 10B:
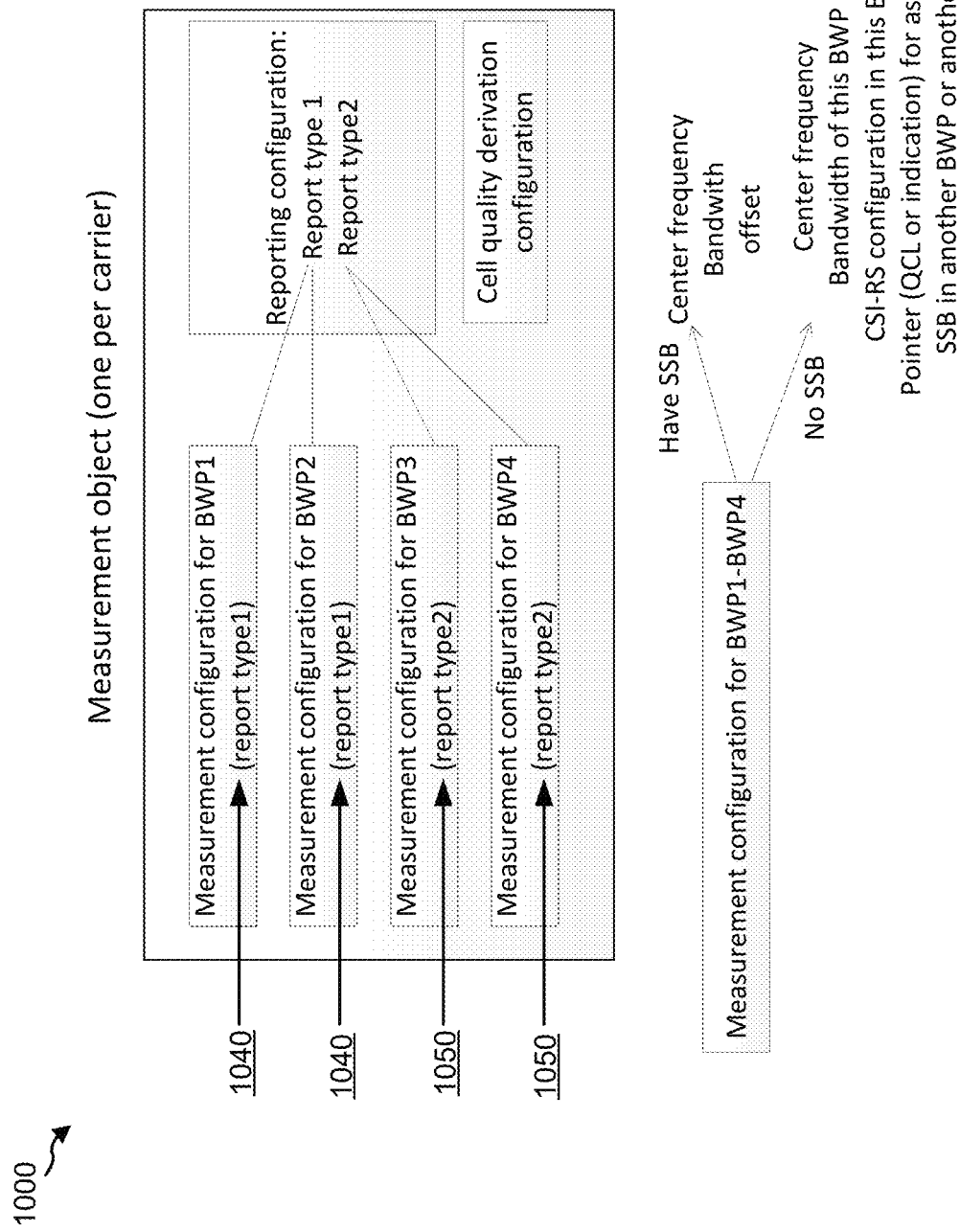

FIGS. 10A and 10B are diagrams illustrating examples 1000 of a measurement object relating to multiple, different bandwidth parts, in accordance with various aspects of the present disclosure.

As shown in FIG. 10A, and by reference number 1010, a measurement object may correspond to a single carrier. This may be more efficient than using a different measurement object for every bandwidth part, or a different measurement object for every measurement configuration and/or reporting configuration.

As shown by reference number 1020, the measurement object may include information identifying a measurement configuration for each bandwidth part of the carrier. Each measurement configuration may include information identifying a corresponding reporting configuration, indicated by a line from each measurement configuration to a corresponding report type. Here, the first and second measurement configurations are associated with the first report type (e.g., Report type 1), and the third and fourth measurement configurations are associated with the second report type (e.g., Report type 2). The reporting configurations are shown by reference number 1030. Here, the reporting configuration for a particular bandwidth part (e.g., associated with a particular bandwidth part identifier) may be identified based at least in part on information, in the corresponding reporting configuration, identifying the particular bandwidth part identifier.

Turning now to FIG. 10B, it can be seen that in some aspects, the reporting configuration for a particular bandwidth part may be identified by a pointer or indication of the corresponding reporting configuration in the measurement configuration for the particular bandwidth part. As shown by reference number 1040, and as an example, BWPs 1 and 2 may be associated with reporting configuration 1. As shown by reference number 1050, and as an example, BWPs 3 and 4 may be associated with reporting configuration 2.

Returning now to FIG. 10A, as shown by reference number 1060, the measurement object may include information identifying a cell quality derivation configuration. For example, the measurement object may indicate how measurement values are to be combined to determine a cell quality value. As a more particular example, the cell quality derivation configuration may indicate whether values are to be averaged, whether a maximum is to be determined, whether a single measured value is to be used (e.g., for a bandwidth part having an NR-PBCH), and/or the like.

As further shown, the measurement configuration for any one of BWPs 1 through 4 (or any other bandwidth part) may include particular information. For example, and as shown by reference number 1070, when a bandwidth part includes a synchronization signal block, the measurement configuration for the bandwidth part may identify a center frequency of the bandwidth part, a bandwidth of the bandwidth part, and/or a frequency offset from the center frequency to the synchronization signal block.

As shown by reference number 1080, when the bandwidth part does not include a synchronization signal block (e.g., when the bandwidth part includes a reference signal), the measurement configuration may identify a center frequency of the bandwidth part, a bandwidth of the bandwidth part, a CSI-RS configuration of the bandwidth part, a pointer (e.g., a quasi co-location or indication pointer) for a synchronization signal bock in another bandwidth part or carrier, and/or the like. In this way, the measurement configuration may indicate information relevant to determining measurement values for the bandwidth part based at least in part on whether the bandwidth part includes a synchronization signal block or a reference signal.

As indicated above, FIGS. 10A and 10B are provided as examples. Other examples are possible and may differ from what was described with respect to FIGS. 10A and 10B.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
    determining one or more measurements regarding a plurality of bandwidth parts of a carrier of the user equipment based at least in part on a measurement object associated with the carrier, wherein the one or more measurements include a particular measurement regarding a particular bandwidth part, of the plurality of bandwidth parts, and wherein the particular bandwidth part comprises a new radio physical broadcast channel;
    determining a cell quality regarding the plurality of bandwidth parts based at least in part on the measurement object and the particular measurement; and
    transmitting a measurement report identifying the one or more measurements and/or the cell quality based at least in part on the measurement object.

2. The method of claim 1, wherein the measurement object identifies multiple, different measurement configurations corresponding to respective bandwidth parts of the plurality of bandwidth parts.

3. The method of claim 1, wherein, when a second bandwidth part, of the plurality of bandwidth parts, does not include a synchronization signal, a measurement configuration for the second bandwidth part identifies at least one of:
    a center frequency associated with the second bandwidth part,
    a pointer associated with a synchronization signal in a third bandwidth part or another carrier,
    a bandwidth associated with the second bandwidth part, or
    a reference signal configuration for the second bandwidth part.

4. The method of claim 1, wherein the new radio physical broadcast channel is an only physical broadcast channel of a cell that provides the carrier.

5. The method of claim 1, wherein the particular bandwidth part is an only bandwidth part, of the plurality of bandwidth parts, comprising the new radio physical broadcast channel.

6. The method of claim 1, wherein the measurement report includes values of the one or more measurements regarding the plurality of bandwidth parts.

7. The method of claim 1, wherein the measurement report is at least one of:
    a periodical report, or
    a triggered report,
    wherein the measurement report is based at least in part on a reporting configuration.

8. The method of claim 1, wherein the measurement report is triggered based at least in part on a cell quality threshold.

9. The method of claim 1, wherein the one or more measurements are determined based at least in part on a radio resource control layer filtering technique.

10. The method of claim 1, wherein the one or more measurements are selectively determined based at least in part on a synchronization signal or a reference signal according to a reporting configuration.

11. The method of claim 2, wherein the measurement object identifies multiple, different reporting configurations for the measurement report, wherein the multiple, different reporting configurations correspond to the respective bandwidth parts of the plurality of bandwidth parts, and wherein the user equipment is configured to identify a particular reporting configuration associated with at least one bandwidth part of the plurality of bandwidth parts of the user equipment.

12. The method of claim 8, wherein the cell quality threshold is based at least in part on a first threshold for a synchronization signal or a second threshold for a reference signal,
   wherein the first threshold or the second threshold is used based at least in part on a reporting configuration of the user equipment.

13. The method of claim 11, wherein a particular measurement configuration, of the multiple, different measurement configurations, that corresponds to the at least one bandwidth part, includes a pointer indicating that the particular reporting configuration is associated with the at least one bandwidth part.

14. The method of claim 11, wherein the particular reporting configuration includes information indicating that the particular reporting configuration is associated with a particular measurement configuration for the at least one bandwidth part.

15. A method of wireless communication performed by a base station, comprising: configuring a measurement object, of a user equipment, in a carrier,
   wherein the measurement object includes multiple measurement configurations for a plurality of bandwidth parts and corresponding reporting configurations for the plurality of bandwidth parts,
   wherein the multiple measurement configurations include a first measurement configuration, corresponding to a first bandwidth part of the plurality of bandwidth parts, and a second measurement configuration, different from the first measurement configuration, corresponding to a second bandwidth part of the plurality of bandwidth parts, and
   wherein at least one bandwidth part, of the plurality of bandwidth parts, includes a new radio physical broadcast channel;
   receiving, from the user equipment, information identifying a capability for switching from the first bandwidth part to the second bandwidth part; and
   configuring a switching pattern of the user equipment based at least in part on the capability and/or the measurement object.

16. The method of claim 15, wherein the capability includes at least a latency for switching from the first bandwidth part to the second bandwidth part.

17. The method of claim 15, wherein the capability is for switching between downlink bandwidth parts.

18. The method of claim 15, wherein the capability is for switching between uplink bandwidth parts.

19. The method of claim 15, wherein the capability is based at least in part on a signaling approach for the first bandwidth part and a signaling approach for the second bandwidth part.

20. A method of wireless communication performed by a user equipment, comprising:
   determining that a threshold is satisfied with regard to a plurality of activated bandwidth parts of the user equipment;
   transmitting a message to cause a recovery or change with regard to the plurality of activated bandwidth parts; and
   receiving, based at least in part on transmitting the message, information identifying an updated bandwidth part pair between the user equipment and a base station.

21. The method of claim 20, wherein the message is a contention-based random access message.

22. The method of claim 20, wherein the threshold relates to at least one of a signal quality value or a load associated with the plurality of activated bandwidth parts.

23. The method of claim 20, wherein a resource for the message in an uplink bandwidth part is indicated in remaining system information of a bandwidth part of the plurality of activated bandwidth parts.

24. The method of claim 20, wherein the message is transmitted in a pre-configured resource of an uplink bandwidth part.

25. The method of claim 20, further comprising retransmitting the message based at least in part on not receiving a response to the message within a threshold length of time.

26. The method of claim 20, wherein determining that the threshold is satisfied comprises determining that the threshold is satisfied for a threshold length of time.

27. A user equipment for wireless communication, comprising:
   a memory; and
   one or more processors coupled to the memory, the one or more processors configured to:
   determine one or more measurements regarding a plurality of bandwidth parts of a carrier of the user equipment based at least in part on a measurement object associated with the carrier, wherein the one or more measurements include a particular measurement regarding a particular bandwidth part, of the plurality of bandwidth parts, and wherein the particular bandwidth part comprises a new radio physical broadcast channel;
   determine a cell quality regarding the plurality of bandwidth parts based at least in part on the measurement object and the particular measurement; and
   transmit a measurement report identifying the one or more measurements and/or the cell quality based at least in part on the measurement object.

28. The user equipment of claim 27, wherein the measurement object identifies multiple, different measurement configurations corresponding to respective bandwidth parts of the plurality of bandwidth parts.

29. The user equipment of claim 27, wherein the new radio physical broadcast channel is an only physical broadcast channel of a cell that provides the carrier.

30. The user equipment of claim 27, wherein the particular bandwidth part is an only bandwidth part, of the plurality of bandwidth parts, comprising the new radio physical broadcast channel.

31. A base station for wireless communication, comprising:
   a memory; and
   one or more processors coupled to the memory, the one or more processors configured to:
   configure a measurement object, of a user equipment, in a carrier,
   wherein the measurement object includes multiple measurement configurations for a plurality of bandwidth parts and corresponding reporting configurations for the plurality of bandwidth parts,
   wherein the multiple measurement configurations include a first measurement configuration, corresponding to a first bandwidth part of the plurality of bandwidth parts, and a second measurement configuration, different from the first measurement configuration, corresponding to a second bandwidth part of the plurality of bandwidth parts, and
   wherein at least one bandwidth part, of the plurality of bandwidth parts, includes a new radio physical broadcast channel;

receive, from the user equipment, information identifying a capability for switching from the first bandwidth part to the second bandwidth part; and configure a switching pattern of the user equipment based at least in part on the capability and/or the measurement object.

32. The base station of claim 31, wherein the capability includes at least a latency for switching from the first bandwidth part to the second bandwidth part.

33. The base station of claim 31, wherein the capability is based at least in part on a signaling approach for the first bandwidth part and a signaling approach for the second bandwidth part.

34. A user equipment for wireless communication, comprising:
a memory; and
one or more processors coupled to the memory, the one or more processors configured to:
determine that a threshold is satisfied with regard to a plurality of activated bandwidth parts of the user equipment;
transmit a message to cause a recovery or change with regard to the plurality of activated bandwidth parts; and
receive, based at least in part on transmitting the message, information identifying an updated bandwidth part pair between the user equipment and a base station.

35. The user equipment of claim 34, wherein the message is a contention-based random access message.

36. The user equipment of claim 34, wherein a resource for the message in an uplink bandwidth part is indicated in remaining system information of a bandwidth part of the plurality of activated bandwidth parts.

37. A non-transitory computer-readable medium storing one or more instructions for wireless communication, the one or more instructions comprising:
one or more instructions that, when executed by one or more processors of a user equipment, cause the one or more processors to:
determine one or more measurements regarding a plurality of bandwidth parts of a carrier of the user equipment based at least in part on a measurement object associated with the carrier, wherein the one or more measurements include a particular measurement regarding a particular bandwidth part, of the plurality of bandwidth parts, and wherein the particular bandwidth part comprises a new radio physical broadcast channel;
determine a cell quality regarding the plurality of bandwidth parts based at least in part on the measurement object and the particular measurement; and
transmit a measurement report identifying the one or more measurements and/or the cell quality based at least in part on the measurement object.

38. The non-transitory computer-readable medium of claim 37, wherein the new radio physical broadcast channel is an only physical broadcast channel of a cell that provides the carrier.

39. The non-transitory computer-readable medium of claim 37, wherein the particular bandwidth part is an only bandwidth part, of the plurality of bandwidth parts, comprising the new radio physical broadcast channel.

40. A non-transitory computer-readable medium storing one or more instructions for wireless communication, the one or more instructions comprising:
one or more instructions that, when executed by one or more processors of a base station, cause the one or more processors to:
configure a measurement object of, a user equipment, in a carrier,
wherein the measurement object includes multiple measurement configurations for a plurality of bandwidth parts and corresponding reporting configurations for the plurality of bandwidth parts,
wherein the multiple measurement configurations include a first measurement configuration, corresponding to a first bandwidth part of the plurality of bandwidth parts, and a second measurement configuration, different from the first measurement configuration, corresponding to a second bandwidth part of the plurality of bandwidth parts, and
wherein at least one bandwidth part, of the plurality of bandwidth parts, includes a new radio physical broadcast channel;
receive, from the user equipment, information identifying a capability for switching from the first bandwidth part to the second bandwidth part; and
configure a switching pattern of the user equipment based at least in part on the capability and/or the measurement object.

41. A non-transitory computer-readable medium storing one or more instructions for wireless communication, the one or more instructions comprising:
one or more instructions that, when executed by one or more processors of a user equipment, cause the one or more processors to:
determine that a threshold is satisfied with regard to a plurality of activated bandwidth parts of the user equipment;
transmit a message to cause a recovery or change with regard to the plurality of activated bandwidth parts; and
receive, based at least in part on transmitting the message, information identifying an updated bandwidth part pair between the user equipment and a base station.

42. An apparatus for wireless communication, comprising:
means for determining one or more measurements regarding a plurality of bandwidth parts of a carrier of the apparatus based at least in part on a measurement object associated with the carrier, wherein the one or more measurements include a particular measurement regarding a particular bandwidth part, of the plurality of bandwidth parts, and wherein the particular bandwidth part comprises a new radio physical broadcast channel;
means for determining a cell quality regarding the plurality of bandwidth parts based at least in part on the measurement object and the particular measurement; and
means for transmitting a measurement report identifying at least one of the one or more measurements or the cell quality based at least in part on the measurement object.

43. The apparatus of claim 42, wherein the new radio physical broadcast channel is an only physical broadcast channel of a cell that provides the carrier.

44. The apparatus of claim 42, wherein the particular bandwidth part is an only bandwidth part, of the plurality of bandwidth parts, comprising the new radio physical broadcast channel.

45. An apparatus for wireless communication, comprising: means for configuring a measurement object of a user equipment in a carrier,
wherein the measurement object includes multiple measurement configurations for a plurality of bandwidth parts and corresponding reporting configurations for the plurality of bandwidth parts, wherein the multiple measurement configurations include a first measurement configuration, corresponding to a first bandwidth part of the plurality of bandwidth parts, and a second measurement configuration, different from the first measurement configuration, corresponding to a second bandwidth part of the plurality of bandwidth parts, and wherein at least one bandwidth part, of the plurality of bandwidth parts, includes a new radio physical broadcast channel;

means for receiving, from the user equipment, information identifying a capability for switching from the first bandwidth part to the second bandwidth part of the plurality of bandwidth parts; and means for configuring a switching pattern of the user equipment based at least in part on the capability and/or the measurement object.

46. An apparatus for wireless communication, comprising:

means for determining that a threshold is satisfied with regard to a plurality of activated bandwidth parts of the apparatus;

means for transmitting a message to cause a recovery or change with regard to the plurality of activated bandwidth parts; and means for receiving information identifying an updated bandwidth part pair between the apparatus and a base station based at least in part on transmitting the message.

* * * * *